Figure 1:
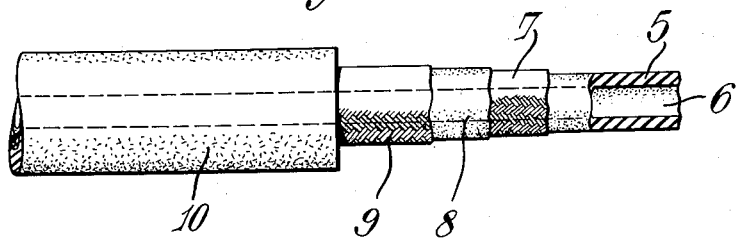

Dec. 5, 1961  J. E. RANDLE ET AL  3,011,525
HIGH PRESSURE FLEXIBLE HOSE
Filed March 12, 1958

Inventors
John E. Randle
David C. Talboys
By Ralph B. Stewart
Attorney

United States Patent Office 3,011,525
Patented Dec. 5, 1961

3,011,525
HIGH PRESSURE FLEXIBLE HOSE
John E. Randle, Leicester, and David Charles Talboys, Leamington Spa, England, assignors, by mesne assignments, to Automotive Products Company Limited, Leamington Spa, England, a British company
Filed Mar. 12, 1958, Ser. No. 720,924
Claims priority, application Great Britain Mar. 18, 1957
1 Claim. (Cl. 138—126)

This invention concerns high-pressure, flexible hose and relates more particularly to hoses such as are used in hydraulic braking installations for vehicles. In these installations it is a common practice to provide an end fitting on the hose whereby the hose may be readily moved and replaced. An end fitting invariably grips the hose by clamping the wall of the hose between an inner and an outer member of the fitting. For example, the outer member may be contracted on to the hose or the inner member may be expanded or again the members may be screw threaded so that when drawn together they clamp the hose wall between the members. The present invention particularly relates to a flexible, high-pressure hose which is intended to receive end fittings.

According to this invention the flexible hose comprises a tube of rubber or like flexible and resilient material which is reinforced by a pair of sleeves, one of braided filaments of rayon and the other of braided filaments of a highly polymeric polymethylene terephthalate applied over the tube. According to a feature of the invention a flexible hose comprises a tube of rubber or like flexible and resilient material reinforced by a pair of sleeves, one of braided filaments of rayon and the other of braided filaments of a highly polymeric polymethylene terephthalate embedded in the wall of the tube.

It is preferred, according to a feature of this invention, that the flexible hose comprises a tube of rubber or like flexible and resilient material reinforced by a pair of braided sleeves, one (the inner) of which is applied to the tube and the other of which is applied to the inner sleeve, the inner sleeve being of filaments of a highly polymeric polymethylene terephthalate and the outer sleeve being of filaments of modified cellulose (e.g. rayon).

The best known polymeric polymethylene terephthalate is polyethylene terephthalate and the use of filaments of this particular material for the inner braided sleeve ensures good resistance of the hose to burst pressure and a long life when subjected to considerable flexing while the rayon when suitably treated provides admirable adhesion with the rubber of the hose and is used to build up an adequate wall thickness on a hose of small bore. Of course the additional wall thickness could be obtained by the use of rubber without reinforcement but when the hose is used with end fittings, as referred to above, it is essential that the rubber have low compression set or cold flow as otherwise adequate grip between the end fitting and the hose may not be obtained. Rayon is selected because it provides the required bulk relatively cheaply and allows the minimum thickness of rubber in the wall section so the effect of the compression characteristics of the rubber is reduced and the hose is strongly gripped by an end fitting. Further the use of rayon filaments for the outer braided sleeve is made because it can be treated to ensure strong adhesion with the covering rubber of the hose and this is essential for security of the end fitting assembly.

A high pressure hose according to the present invention may therefore incorporate a small bore and a thick wall reinforced by a relatively expensive braiding material which is used to the minimum extent and by a cheaper braiding material which is utilised, firstly, to provide the necessary wall thickness, secondly, to reduce the effect of the compression characteristics of the rubber so that the end fitting will remain attached to the hose under the high pressures which are being used and, thirdly, to provide good adhesion with the rubber-like material of the hose.

It is important that the angle of the filaments of the braided sleeves be accurately controlled if the maximum strength and optimum performance characteristics is to be obtained. To this end, according to a feature of the invention, the filaments of both the rayon and of highly polymeric polymethylene terephthalate make an angle in the braided sleeves between 53° and 56° to the long axis of the hose and preferably said angle is 54° to 55°. It has been found in practice that the very accurate control of the angle referred to is essential for optimum properties and that an angle in the range 54° to 55° provides this.

Untreated highly polymeric material as referred to above does not have great adhesion with rubber. So as to enhance the adhesion of this material to the rubber it is proposed, according to a further feature of the present invention, that the sleeve of said material shall be coated with a paste or dough of rubber material, the paste or dough being so applied that it is forced between the interstices of the filaments of the sleeve. In this way the sleeve of polymeric material as above set forth is locked to an interlayer made from the paste or dough. The paste or dough passes through the interstices and strongly adheres to the inner tube. Accordingly the sleeve of said polymeric material is attached to the inner tube without resort to mechanical or chemical treatment of the filaments of said material. The rayon sleeve is applied over said interlayer and since the rayon suitably treated (e.g. by dipping in an adhesive agent such as latex resorcinol formaldehyde) has good adhesion with the rubber a strong bond results. To some extent at least the paste or dough (and the interlayer resulting therefrom) will mechanically interlock with the rayon sleeve since the material will be forced into the interstices between the filaments of the rayon sleeve.

Although it is preferred to use a paste or dough to form the interlayer this is not essential and a strip or tube of rubber-like material may be applied over the sleeve of said polymeric material. Thereafter the rayon sleeve is formed over the interlayer.

Figure 2:
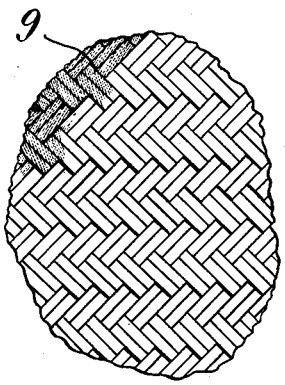

A practical application of the invention will now be described, by way of example, with reference to the drawings whereof:

FIG. 1 is a side view of a flexible hose in accordance with the present invention, parts being removed to show the construction of the hose, and FIG. 2 is an enlarged diagrammatic view of the braided sleeves from which the hose is made.

Referring to the drawings: the hose comprises an inner tube 5 of rubber or the like flexible and resilient material having a relatively small bore 6. A sleeve 7 of braided filament of polyethylene terphthalate is applied to the inner tube and thereafter an interlayer 8 is formed by applying a paste or dough of rubber or the like flexible and resilient material to the sleeve 7 so that the paste is forced between the interstices of the filaments of the sleeve 7. The interlayer is relatively thin and is covered by a braided sleeve 9 of rayon filaments. The material of the interlayer will interlock with the sleeves 7 and 9 in the manner indicated above. Finally, a covering layer 10 of rubber or like flexible and resilient material is applied to the rayon sleeve.

By the term filaments as used in the specification and claims is to be understood either the product obtained from forcing a highly polymeric polymethylene terephthalate in a molten condition, or a modified cellulose in solution through spinnerets in the manner well known in the synthetic textile industry, or thin strips cut from sheet, foil or film of said materials, said products being used in the spun staple form, if desired.

In the particular arrangement being described each filament of polyethylene terephthalate comprises 4, 5 or 6 strands of 250 denier which are plied together. The rayon is of 1650 denier. The strands of polyethylene terephthalate are twisted with about 6 turns per inch and this is also done with the strands of the rayon.

As shown in FIG. 2 each of the two sleeves comprise a group of two side-by-side filaments which are together braided to form the sleeve.

In one construction the hose has a bore of 1/8 inch and an outside diameter of approximately 7/16 inch and in another construction the bore is of 3/16 inch and the outside diameter approximately 1/2 inch.

We claim:

A flexible high pressure hose comprising: an inner tube of rubber or like flexible resilient material having a reinforcing sleeve thereon composed of braided filaments of a highly polymeric polymethylene terephthalate, an interlayer of rubber and an outer braided sleeve applied over said interlayer, said interlayer interlocking said braided sleeves together with parts of the interlayer entered between the interstices of the filaments of the braided sleeves, said outer sleeve composed of braided filaments of modified cellulose.

References Cited in the file of this patent

UNITED STATES PATENTS

| | | |
|---|---|---|
| 1,978,211 | Loughead | Oct. 23, 1934 |
| 2,652,093 | Burton | Sept. 13, 1953 |
| 2,690,769 | Brown | Oct. 5, 1954 |
| 2,800,145 | Prierls et al. | July 23, 1957 |
| 2,833,313 | Penman | May 6, 1958 |
| 2,888,954 | Gates | June 2, 1959 |
| 2,899,982 | Harpfer | Aug. 18, 1959 |

FOREIGN PATENTS

| | | |
|---|---|---|
| 833,492 | France | July 18, 1938 |
| 1,141,589 | France | Mar. 18, 1957 |